UNITED STATES PATENT OFFICE.

GUSTAF HENRIK HULTMAN, OF STOCKHOLM, SWEDEN.

PROCESS FOR MANUFACTURING CHROME ALUM.

1,403,960. Specification of Letters Patent. Patented Jan. 17, 1922.

No Drawing. Application filed April 28, 1921. Serial No. 465,276.

*To all whom it may concern:*

Be it known that I, GUSTAF HENRIK HULTMAN, a subject of the King of Sweden, residing at Stockholm, Sweden, have invented new and useful Improvements in Processes for Manufacturing Chrome Alum, (for which I have filed an application in Sweden March 1, 1920,) of which the following is a specification.

This invention relates to the manufacture of the double sulphates known as chromium alums, and consists of an improvement in or modification of the invention forming the subject of my prior Patent No. 1343725, dated June 15th 1920. That invention comprises a process for the manufacture of chrome alum, characterized by the fact that ferro-chrome is dissolved in sulphuric acid and that a soluble potash salt is added to this solution, after which chrome alum is crystallized out. This content of iron of the original solution can be reduced by crystallizing-out ferrous-sulphate before the addition of the potash salt, whereby the output of pure chrome alum is increased.

I now have found that other soluble alkali salts can also be used instead of soluble potash salts. If a soluble ammonium salt be used, for instance sulphate of ammonium, ammonium chromium alum is obtained. Ammonium salts seem also to offer certain advantages over potash salts, experiments made with sulphate of ammonium having shown that the crystallizing-out of the alum has taken place in shorter time. Soluble sodium salts give sodium chromium alum, which it is true cannot readily be crystallized but which can be used in solution as a chromium alum.

What I claim is:—

1. A process of manufacturing chrome alum, which consists in dissolving ferro-chrome in sulphuric acid, and adding thereto a soluble ammonium salt.

2. The process of manufacturing chrome alum, which consists in dissolving ferro-chrome in sulphuric acid, and adding sulphate of ammonium to the solution.

In testimony whereof I have signed my name to this specification.

GUSTAF HENRIK HULTMAN.